United States Patent [19]
Tischler et al.

[11] Patent Number: 6,019,823
[45] Date of Patent: Feb. 1, 2000

[54] SORBENT-BASED FLUID STORAGE AND DISPENSING VESSEL WITH REPLACEABLE SORBENT CARTRIDGE MEMBERS

[75] Inventors: Michael A. Tischler, Phoenix, Ariz.; Peter S. Kirlin, Newtown, Conn.

[73] Assignee: Advanced Technology Materials, Inc., Danbury, Conn.

[21] Appl. No.: 09/080,615

[22] Filed: May 18, 1998

Related U.S. Application Data

[60] Provisional application No. 60/046,784, May 16, 1997.

[51] Int. Cl.⁷ .............................. B01D 53/02; F17C 11/00
[52] U.S. Cl. ............................... 96/108; 95/143; 206/0.7; 502/407; 502/415
[58] Field of Search ............................ 95/116, 141, 143; 96/108; 206/0.7; 502/400–402, 407, 414, 415

[56] References Cited

U.S. PATENT DOCUMENTS

| | | | |
|---|---|---|---|
| 240,423 | 4/1881 | James | 206/0.7 X |
| 1,608,155 | 11/1926 | Barnebey | 206/0.7 X |
| 2,356,334 | 8/1944 | Maude et al. | 206/0.7 X |
| 2,663,626 | 12/1953 | Spangler | 206/0.7 X |
| 2,987,139 | 6/1961 | Bush | 95/133 |
| 2,997,371 | 8/1961 | Wadsworth et al. | 95/131 X |
| 3,006,153 | 10/1961 | Cook | 206/0.7 X |
| 3,116,132 | 12/1963 | Haller et al. | 95/116 X |
| 3,144,200 | 8/1964 | Taylor et al. | 96/108 X |
| 3,151,919 | 10/1964 | Barth | 206/0.7 X |
| 3,287,432 | 11/1966 | Sensel | 95/143 X |
| 3,675,392 | 7/1972 | Reighter | 95/96 |
| 3,713,273 | 1/1973 | Coffee | 95/143 |
| 3,719,026 | 3/1973 | Sand | 95/143 X |
| 3,776,283 | 12/1973 | Kramer et al. | 141/45 |
| 3,788,036 | 1/1974 | Lee et al. | 95/101 |
| 4,023,701 | 5/1977 | Dockery | 206/0.7 X |
| 4,263,018 | 4/1981 | McCombs et al. | 95/98 X |
| 4,343,770 | 8/1982 | Simons | 206/0.7 X |
| 4,414,005 | 11/1983 | DeBiévre et al. | 95/127 |
| 4,578,256 | 3/1986 | Nishino et al. | 95/116 X |
| 4,749,384 | 6/1988 | Nowobilski et al. | 96/108 X |
| 4,761,395 | 8/1988 | Tom et al. | 502/400 X |
| 4,881,958 | 11/1989 | Eckardt et al. | 96/127 X |
| 5,051,117 | 9/1991 | Prigge et al. | 95/143 X |
| 5,089,244 | 2/1992 | Parent et al. | 95/116 X |
| 5,133,787 | 7/1992 | Diot et al. | 96/121 |
| 5,151,395 | 9/1992 | Glenn | 502/407 X |
| 5,202,096 | 4/1993 | Jain | 95/139 X |
| 5,238,469 | 8/1993 | Briesacher et al. | 96/108 X |
| 5,385,689 | 1/1995 | Tom et al. | 502/415 X |
| 5,409,526 | 4/1995 | Zheng et al. | 96/132 |
| 5,417,742 | 5/1995 | Tamhankar et al. | 95/143 |
| 5,518,528 | 5/1996 | Glenn et al. | 206/0.7 X |
| 5,761,910 | 6/1998 | Tom | 96/108 X |

FOREIGN PATENT DOCUMENTS

| | | |
|---|---|---|
| 1095796 | 12/1960 | Germany . |
| 2264512 | 3/1971 | Germany . |
| 3139-781 | 7/1981 | Germany . |
| 52-72373 | 12/1975 | Japan . |
| 63-88017 | 12/1986 | Japan . |
| 3-127606 | 9/1989 | Japan . |
| 1181692A | 11/1983 | U.S.S.R. . |
| 1544475A1 | 7/1987 | U.S.S.R. . |
| 1583151A1 | 5/1988 | U.S.S.R. . |

OTHER PUBLICATIONS

"Beaded Carbon UPS Solvent Recovery", *Chemical Engineering*, vol. 84, No. 18, pp. 39–40, Aug. 29, 1977.

*Primary Examiner*—Kevin P. Shaver
*Attorney, Agent, or Firm*—Steven J. Hultquist; Oliver A.M. Zitzmann

[57] ABSTRACT

Solid-phase physical sorbent medium holding adsorbed fluid is provided in a cartridge, for use in a sorbent-based fluid storage and dispensing system. One or more of such cartridges may be disposed in a fluid storage and dispensing vessel and opened prior or subsequent to sealing of the vessel, to provide desorbable fluid for dispensing from the vessel, e.g., by pressure differential, concentration differential and/or thermal desorption. Use of such cartridges thereby obviates the sorbent bake-out and sorbate gas loading steps necessary in prior practice, thereby simplifying the manufacture of the fluid storage and dispensing system.

18 Claims, 4 Drawing Sheets

SORBENT-BASED FLUID STORAGE AND DISPENSING VESSEL WITH REPLACEABLE SORBENT CARTRIDGE MEMBERS

CROSS-REFERENCE TO RELATED APPLICATION

This application is based on and claims priority of United States Provisional Patent Application Ser. No. 60/046,784 filed May 16, 1997 in the names of Michael A. Tischler and Peter S. Kirlin for "Sorbent-Based Fluid Storage and Dispensing Vessel with Replaceable Sorbent Cartridge Members."

BACKGROUND OF THE INVENTION

1. Field of the Invention

This invention relates generally to storage and dispensing systems for the selective dispensing of fluid from a vessel in which the fluid is sorptively retained by a solid sorbent medium, and is desorptively released from the sorbent medium in the dispensing operation. More particularly, the present invention relates to a system of such type in which the storage and dispensing vessel utilizes replaceable sorbent cartridge members.

2. Description of the Related Art

In a wide variety of industrial processes and applications, there is a need for a reliable source of process fluid(s) which is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

In the use of the aforementioned storage and dispensing vessel, it is common practice to fill the vessel with sorbent medium in the initial fabrication procedure, and to subject the vessel and contained sorbent to a high temperature bake-out, to remove water, atmospheric gases, and other extraneous components from the sorbent medium and from the vessel so that the performance and reliability of the storage and dispensing system are not compromised in subsequent service, by contamination, e.g., from outgassing of the vessel walls or the sorbent itself.

In such processing, the vessel is cleaned relatively quickly in relation to the microporous sorbent.

It would therefore be a significant advance in the art, and accordingly is an object of the present invention, to provide a storage and dispensing system of the above-described type, which shortens the processing time for fabrication.

It is another object of the invention to provide a fluid storage and dispensing system wherein the sorbent is packaged as a convenient disposable for use in the system, so that the vessel per se can be quickly degassed and readied for sorbent loading in the manufacture of the storage and dispensing assembly.

Other objects and advantages of the invention will be more fully apparent from the ensuing disclosure.

SUMMARY OF THE INVENTION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. Means are provided for discharging desorbed fluid from the storage and dispensing vessel, such as a dispensing assembly coupled in gas flow communication with the storage and dispensing vessel, and constructed and arranged for selective on-demand dispensing of desorbed fluid. The dispensing may be effected with thermal, concentration differential- and/or pressure differential-mediated desorption of the fluid from the sorbent material. The dispensing assembly may be constructed and arranged:

(I) to provide, exteriorly of said storage and dispensing vessel, a pressure below said interior pressure, to effect desorption of fluid from the sorbent material, and flow of desorbed fluid from the vessel through the dispensing assembly; and/or (II) to flow thermally desorbed fluid therethrough, and comprising means for heating the sorbent material to effect desorption of the fluid therefrom, so that the desorbed fluid flows from the vessel into the dispensing assembly.

Alternatively, a concentration differential may be employed to effect desorption of the fluid from the solid-phase physical sorbent medium. Such concentration differential may be imposed concomitant to pressure differential-mediated desorption of the fluid from the solid-phase physical sorbent medium, or such concentration differential may be imposed by flow of a carrier gas through the storage and dispensing vessel, so that the concentration differential driving force effects desorption resulting in entrainment of desorbed fluid in the carrier gas stream.

The sorbent medium in the storage and dispensing system may include any suitable sorbent material. Preferred substrates include crystalline aluminosilicate compositions, e.g., with a pore size in the range of from about 4 to about 13 Å, although crystalline aluminosilicate compositions having larger pores, e.g., so-called mesopore compositions with a pore size in the range of from about 20 to about 40 Å are also potentially usefully employed in the broad practice of the invention.

Examples of such crystalline aluminosilicate compositions include 5A molecular sieve, and preferably a binderless molecular sieve.

Potentially useful carbon sorbent materials include so-called bead activated carbon of highly uniform spherical particle shape, e.g., BAC-MP, BAC-LP, and BAC-G-70R, available from Kreha Corporation of America, New York, N.Y.

Although carbon sorbents and molecular sieve materials such as crystalline aluminosilicates are preferred in many instances, the solid-phase physical sorbent medium may usefully comprise other materials such as silica, alumina, macroreticulate polymers, kieselguhr, etc.

The sorbent materials may be suitably processed or treated to ensure that they are devoid of trace components which deleteriously affect the performance of the gas storage and dispensing system. For example, carbon sorbents may be subjected to washing treatment, e.g., with hydrofluoric acid, to render them sufficiently free of trace components such as metals and oxidic transition metal species.

The invention in one aspect thereof relates to the provision, in a storage and dispensing vessel of the above-described type, of a sorbent cartridge unit, which is readily introduced to the storage and dispensing vessel. This expedient allows the vessel to be quickly, easily and separately prepared for receipt of the packaged sorbent. The manufacturing process is thereby substantially simplified by the use of prepackaged modular sorbent articles.

Other aspects and features of the invention will be more fully apparent from the ensuing disclosure and appended claims.

DETAILED DESCRIPTION OF THE INVENTION, AND PREFERRED EMBODIMENTS THEREOF

The disclosures of the following U.S. patents and U.S. patent applications are hereby incorporated herein by reference in their entirety:

U.S. patent application Ser. No. 08/809,019 filed Apr. 11, 1997 pending;

U.S. Pat. No. 5,518,528 issued May 21, 1996;

U.S. Pat. No. 5,704,965 issued Jan. 6, 1998;

U.S. Pat. No. 5,704,967 issued Jan. 6, 1998;

U.S. Pat. No. 5,707,424 issued Jan. 13, 1998;

U.S. Pat. No. 5,761,910 issued Jun. 9, 1998; and

U.S. patent application Ser. No. 09/002,278 filed Dec. 31, 1997 pending.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids.

Figure 1:
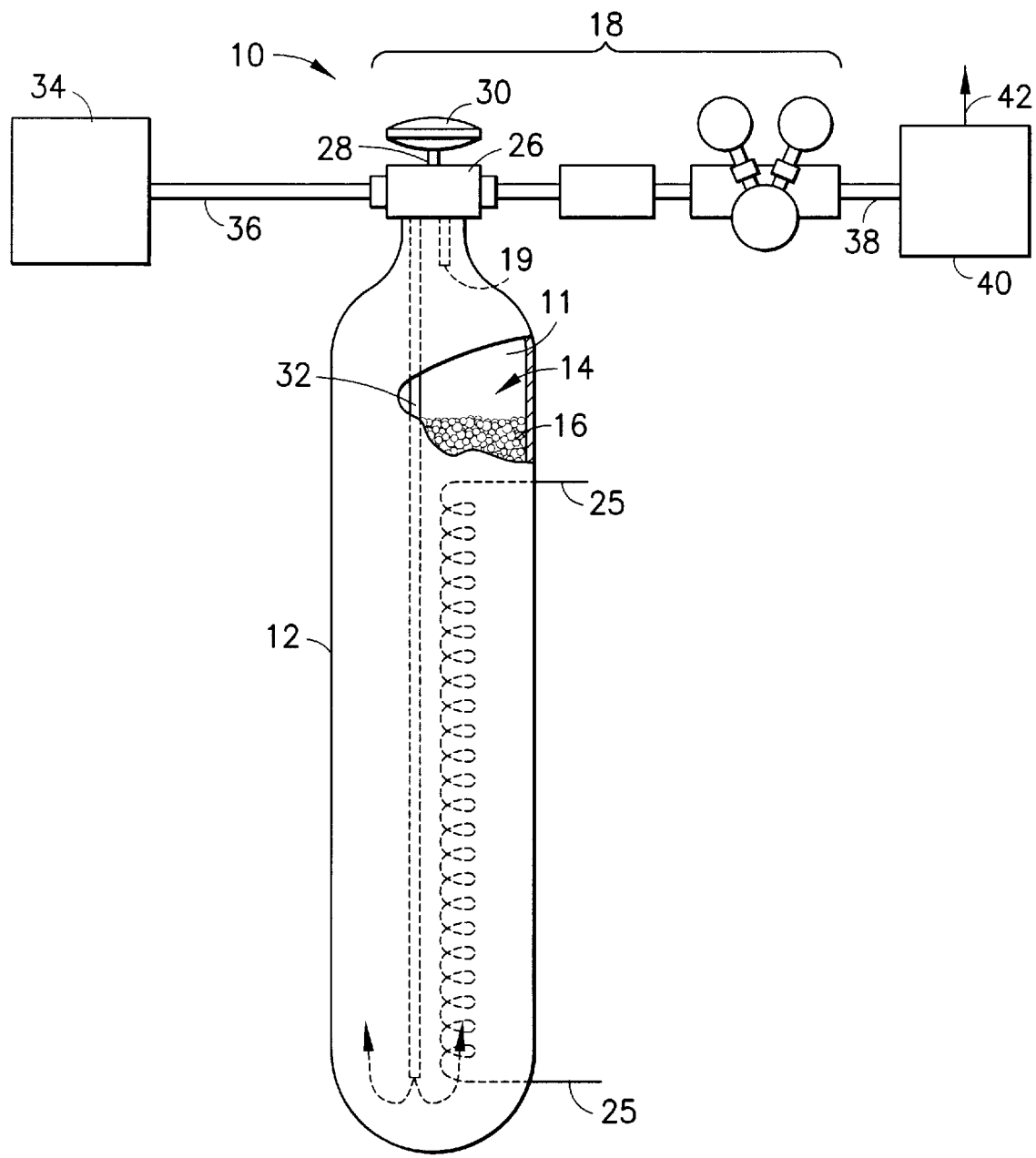
FIG. 1 is a schematic perspective representation of a storage and dispensing vessel and associated flow circuitry according to one embodiment of the invention, which may be usefully employed for the storage and dispensing of fluid.

Referring now to the drawings, FIG. 1 is a schematic representation of a storage and dispensing system 10 comprising storage and dispensing vessel 12 which may be usefully employed for supplying laser gas to a laser apparatus in the broad practice of the present invention. The storage and dispensing vessel may for example comprise a conventional gas cylinder container of elongate character. In the interior volume of such vessel is disposed a bed 14 of a suitable sorbent medium 16 having appropriate sorptive affinity for the laser gas, whereby the laser gas may be readily sorbed on the sorbent medium 16 at appropriate loading, for storage and subsequent dispensing of the laser gas to the laser apparatus.

The vessel 12 is provided at its upper end with a conventional cylinder head fluid dispensing assembly 18 including valve body 26 linked by stem 28 to hand wheel 30, and coupled to port 19. Port 19 allows fluid flow from the interior volume 11 of the cylinder through the valve head into the dispensing assembly 18. To prevent entrainment of particulate solids in the fluid being dispensed from the cylinder, the port 19 may be provided with a frit or other filter means therein.

The cylinder may be provided with various means for discharging desorbed gas from the cylinder, such as the port 19 and dispensing assembly 18 illustratively shown. Such discharge means may include: conduits, pipes, tubes, and channels; flow control means such as flow control valves, pressure-actuated valves, mass flow controllers, and manifolding; motive fluid flow devices such as pumps, blowers, impellers, eductors, ejectors, fans, cryopumps, and vacuum extractors; as well as ports, flow passage openings, etc., as may be desired or appropriate in a given end use application of the present invention.

The vessel 12 may be provided with internal heating means such as heating coil 25 that may be energized by suitable means (not shown), to thermally assist desorption of the sorbate fluid. Preferably, however, the sorbate fluid is at least partially, and most preferably fully, dispensed from the storage and dispensing vessel containing the adsorbed fluid by pressure differential-mediated desorption and/or concentration differential-meidated desorption. Such pressure differential may be established by flow communication between the storage and dispensing vessel, on the one hand, and the exterior dispensing environment or locus of use, on the other. A concentration differential may be created concomitantly by pressure differential, or may be otherwise created by flow of a suitable carrier gas through the vessel e.g., from carrier gas source 34 to carrier gas feed conduit 36, valve head 26 and dip tube 32, to mediate desorption of fluid from the sorbent material. Illustrative of potentially useful carrier gas species are argon, nitrogen, helium, hydrogen, etc.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc. Other sorbent materials potentially useful in the broad practice of the present invention include porous silicon, porous Teflon®, clays, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The sorbent may be provided in the form of particles, granules, extrudates, powders, cloth, web materials, honeycomb or other monolithic forms, composites, or other suitable conformations of useful sorbent materials, having sorptive affinity for the fluid sought to be stored and subsequently dispensed, and satisfactory desorption characteristics for the dispensing operation.

As mentioned, although it generally is preferred to operate solely by pressure differential and/or concentration differential, in respect of the sorption and desorption of the gas to be subsequently dispensed, the system of the invention may in some instances advantageously employ a heater operatively arranged in relation to the storage and dispensing vessel for selective heating of the solid-phase physical sorbent medium, to effect thermally-enhanced desorption of the sorbed fluid from the solid-phase physical sorbent medium.

The apparatus of the invention optionally may be constructed with a solid-phase physical sorbent medium being present in the storage and dispensing vessel together with a chemisorbent material having a sorptive affinity for contaminants, e.g., decomposition products, of the sorbate fluid therein.

Gas from dispensing assembly 18 is discharged in line 38 to process facility 40 in which the gas is utilized, producing a final waste gas stream discharged from the facility 40 in vent line 42.

Figure 2:
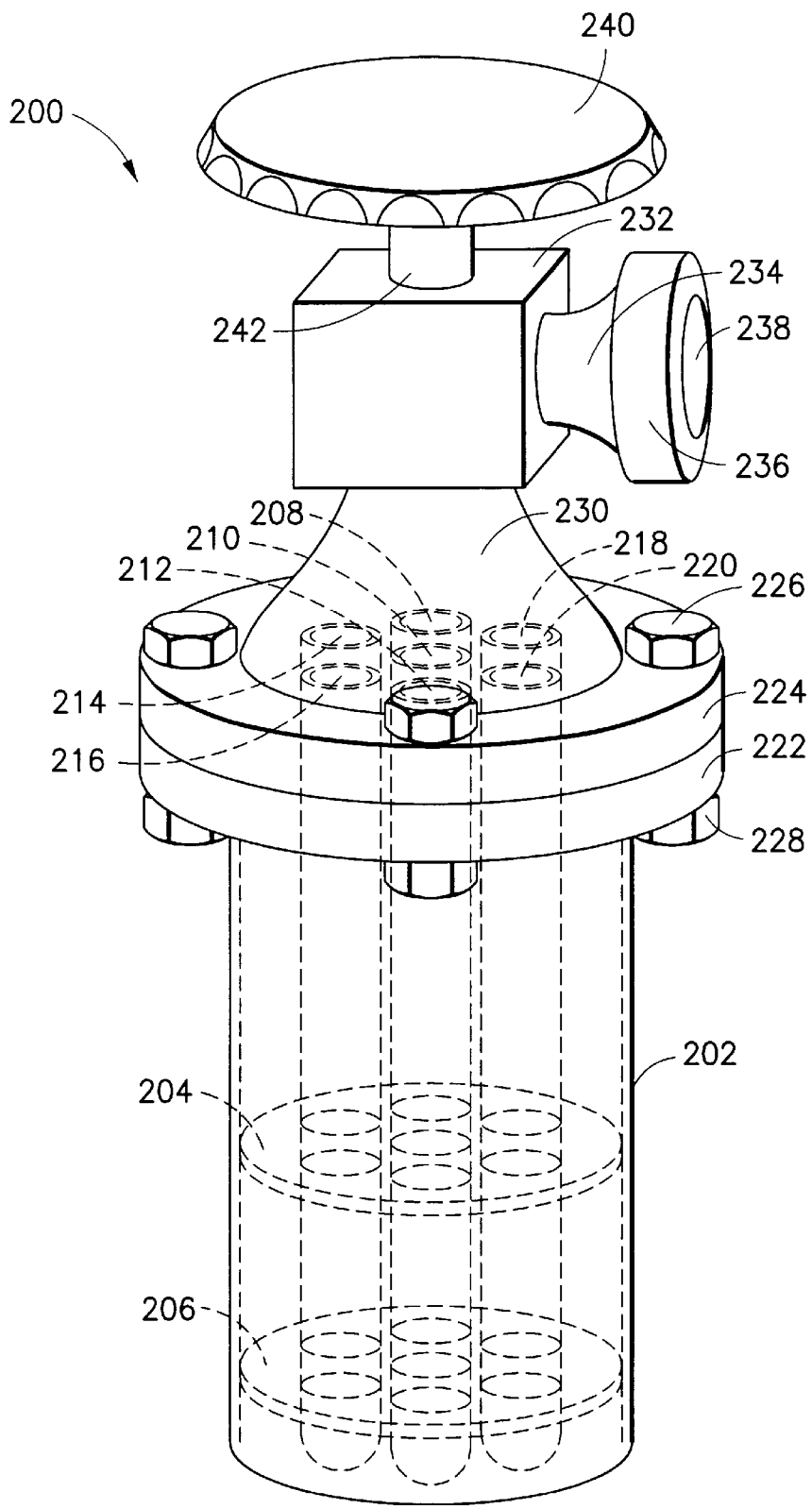
FIG. 2 is a schematic perspective view of a fluid storage and dispensing vessel according to one embodiment of the present invention.

FIG. 2 is a schematic perspective view of a storage and dispensing vessel 200 according to one embodiment of the present invention.

The vessel 200 comprises a lower receptacle member 202 including a bounding wall enclosing an interior volume. The interior volume contains axially spaced-apart multi-tube retention plates 204 and 206 for receiving in the openings of the retention plates a multiplicity of sorbent cartridges 208, 210, 212, 214, 216, 218 and 220, each containing a volume of sorbent material as described hereinafter in greater detail.

The lower receptacle member 202 includes at its upper end a radially extending, circumferentially continuous flange 222. Such flange mates with a complementarily configured flange 224 of an upper receptacle member 230. The respective flanges 222 and 224 are provided with complementarily registerable openings accommodating passage therethrough of bolt fasteners 226 which threadably engage nut elements 228, as shown, so that the upper receptacle portion 230 and the lower receptacle portion 202 are matably engageable in leak-tight fashion.

The vessel at its upper receptacle portion 230 is joined to a valve head 232 which includes a manually rotatable wheel 240 mounted on valve stem 242 for selectively opening or closing the valve element (not shown) in the valve head 232, and releasing sorbate fluid to the discharge portion 238 of the valve head.

Figure 3:
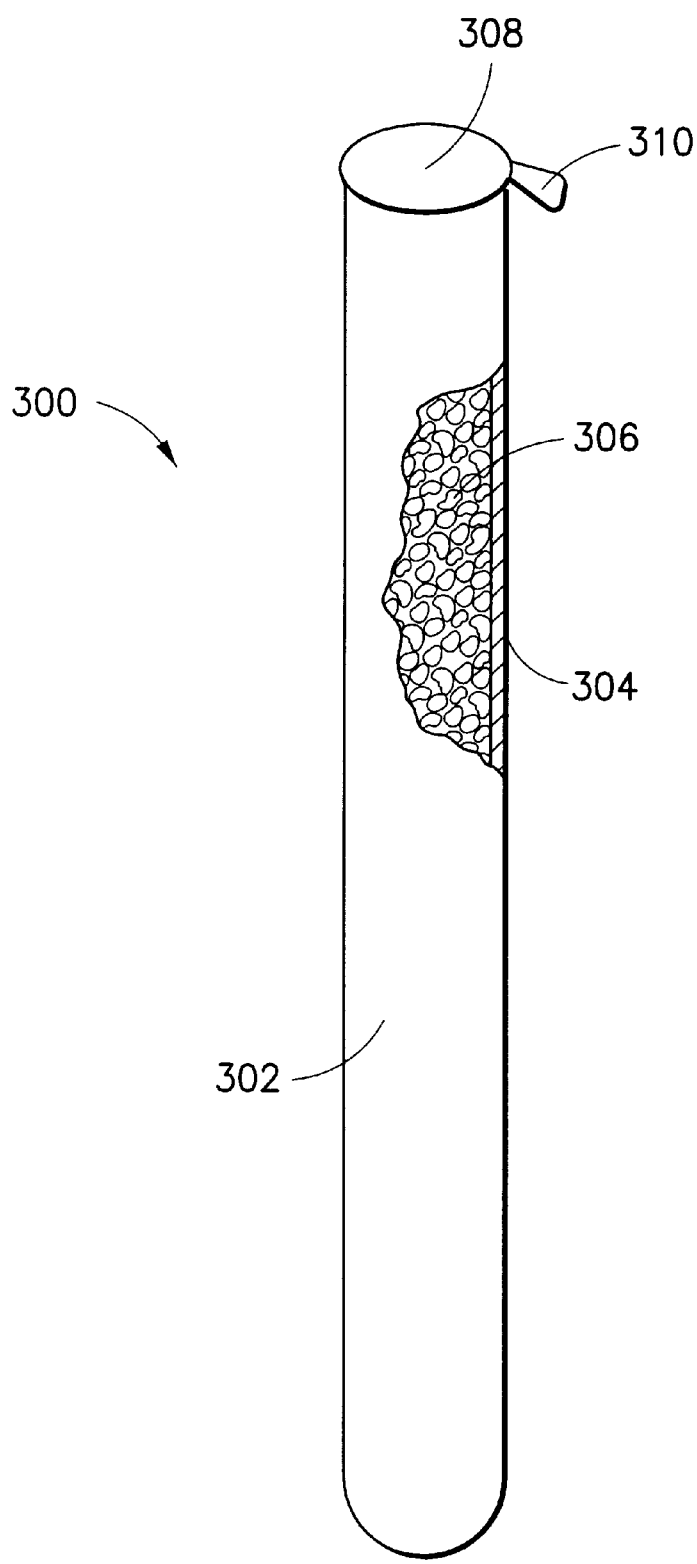
FIG. 3 is a schematic perspective view, partially broken away, of a modular sorbent cartridge according to an illustrative aspect of the invention.

FIG. 3 is a schematic perspective view, partially broken away, of a modular sorbent cartridge 300 according to an illustrative aspect of the invention. The sorbent cartridge 300 is of vertically elongate form comprising a cartridge body 302 defining therewithin an interior volume bounded by wall 304 and enclosing a body of sorbent medium 306 therein. The cartridge body at its upper end is leak-tightly hermetically sealed with a foil liner seal 308 having an integral pull-tab 310 on a side edge surface thereof as illustrated. The cartridge body 302 is also formed of a fluid impermeable material of construction.

In use, the cartridge 300 is opened in a glove box or laminar flow hood purged by inert or otherwise benign gas which is non-sorbable by the sorbent material in the cartridge by pull-off of the tabbed foil liner seal 308. The upper and lower receptacle portions are disposed in the glove box or hood, and the exposed cartridge is inserted through the appropriate registered openings in the retention plates 204 and 206, into position in the lower receptacle portion 202.

Any number of cartridges accommodated by the retention plates may be introduced to the lower receptacle portion of the vessel, following which the upper and lower receptacle portions are matably engaged and secured with bolt and nut fastener assemblies as shown in FIG. 2, to sealably enclose the exposed sorbent cartridges.

Subsequently, in use, the sorbate on the sorbent medium in the cartridges may be desorbed and dispensed by pressure differential, viz., between the pressure of the interior volume of the vessel, and an exterior lower-than-interior pressure which when the valve of valve head 232 is opened, causes the sorbate to desorb from the sorbent medium, for discharge from the storage and dispensing vessel. Additionally, or alternatively, the sorbent in the sorbent cartridges may be desorbed of the sorbate fluid thereon, by thermal desorption, in which the sorbent medium is heated to effect desorptive release of the sorbate therefrom. As a still further alternative, the sorbate in the sorbent cartridges may be desorbed of the sorbent fluid thereon by concentration differential, which may be incident to the pressure differential desorption, or may be independently effected by flow of a carrier gas stream through the storage and dispensing vessel, as hereinabove described with reference to FIG. 1.

By the provision of disposable sorbate-loaded sorbent cartridges in a storage and dispensing vessel as herein disclosed, it is possible in the fabrication of the storage and dispensing system to quickly and easily bake-out the storage and dispensing vessel, following which the sorbent cartridges are opened under protective atmosphere, and easily inserted into the vessel. The vessel can then be readily sealed, to provide the sorbate loaded sorbent in the vessel, ready for dispensing.

Figure 4:
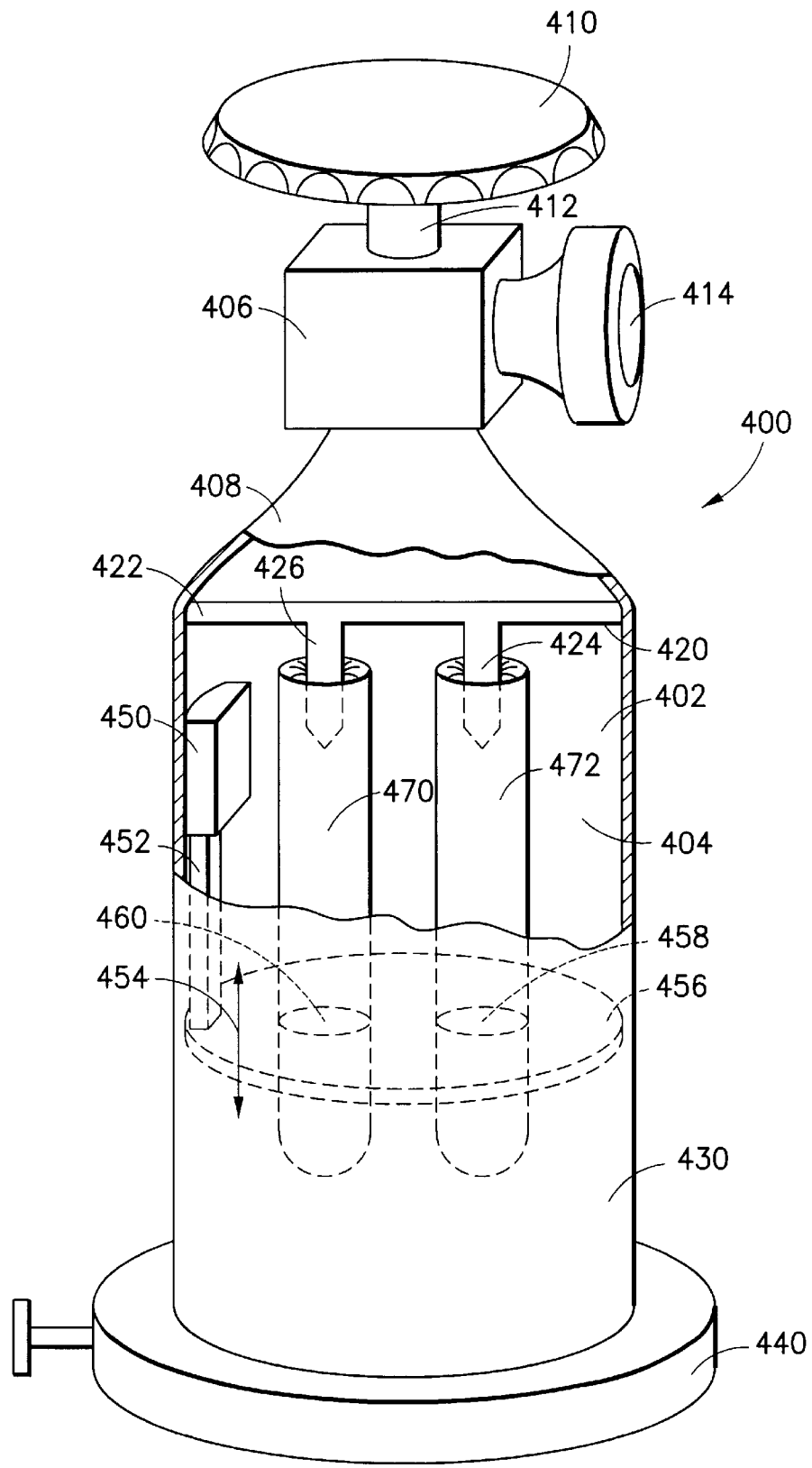
FIG. 4 is a schematic perspective view of a modular sorbent cartridge-equipped fluid storage and dispensing vessel according to another embodiment of the invention.

FIG. 4 is a schematic perspective view of a storage and dispensing vessel 400 according to another embodiment of the invention.

The storage and dispensing vessel 400 comprises a main cylindrical housing 402 defining an interior volume 404 therewithin. The housing 402 is joined to a valve head 406 at the neck portion 408 of the housing. The valve head features a valve handle 410 which may be manually or automatically actuated, such handle being joined by valve stem 412 to an active valve element (not shown) in valve head 406.

Valve head 406 is joined to discharge port 414, which features a flanged terminus, by means of which the storage and dispensing vessel can be coupled to a dispensing assembly, comprising flow monitoring and regulating means (not shown).

The upper end of the housing 402 features a spiked fixture 420 comprising horizontally extending support bar 422 joined to vertically downwardly extending spike members 424 and 426.

The bottom portion 430 of the housing 402 is constructed for joining to a gate valve 440, to sealingly enclose the lower open end of the housing 402.

Mounted on the inner wall of housing 402 is a motor 450 which may be of any convenient type, as for example an electric motor, which is joined by suitable cam and gear structure (not shown) within the housing of motor 450, to the reciprocatable arm 452 which is arranged for selective vertical translation movement in either of the upward or downward directions indicated by arrow 454. At its lower extremity, the arm 452 is joined to mounting plate 456 having sorbent reservoir openings 458 and 460 therein. The mounting plate 456 thus is vertically translated by arm 452 under the motive impetus of motor 450. Motor 450 is arranged to be selectively operative to raise or lower the arm 452 as desired. The arm is typically in a lower extending position, at the time of mounting of the sorbent containers 470 and 472 in the receiving openings 458 and 460 of mounting plate 456.

In use, the sorbent cartridges 470 and 472 are loaded in the receiving openings 458 and 460 of the mounting plate, with the gate valve 440 being removed from engagement with the housing 402, to permit bottom loading of the cartridges. Subsequent to installation, the gate valve is closed. Next the cylinder valve comprising valve head 406 and valve actuator 410 is open, and suitable evacuation means are coupled with the discharge port 414, to evacuate the interior volume 404 of the storage and dispensing vessel.

After evacuation has been completed to the desired extent, the cylinder valve is closed. Next, the motor 450 is actuated to retract the arm 452 in the upward direction, thereby drawing the mounting plate 456 and the sorbent cartridges 470 and 472 mounted thereon, in the upward direction. With continued upward translation, the spike elements 424 and 426 pierce the top end surfaces of the sorbent cartridges, thereby exposing the sorbent in the cartridges to the interior volume 404 and placing the storage and dispensing vessel 400 in condition for subsequent operation.

The sorbent cartridges 470 and 472 each contain a suitable sorbent having affinity for a gas to be desorptively dispensed from the vessel. Subsequent to puncturing of the respective cartridges, the sorbate may be desorbed from the sorbent in the cartridges, by pressure differential, concentration differential or by thermal desorption technique, or by two or more of such modalities of desorption, as necessary or desired in a given end use application of such embodiment of the invention.

By modulating the valve handle 410, a selected flow rate of desorbed sorbable fluid can be dispensed through the discharge port 414 and pass to downstream usage, e.g., ion implantation, or the discharge port may be left open to the ambient environment, or remotely actuated to effect dissemination of gas, e.g., fumigating or crop protection gases, etc.

It will be appreciated that the remotely actuatable character of the embodiment shown in FIG. 4 permits a variety of gas dissemination applications to be achieved.

The use of a fluid-retaining solid-phase physical sorbent medium in cartridges in accordance with the present invention achieves a substantial advance in the art. In prior practice, substantial time, effort and cost have been expended in the separate manufacturing steps of providing storage and dispensing vessels, charging physical adsorbent media into the vessel, baking out the vessel to drive off extraneous gases and contaminants, charging the sorbate gas into the vessel for take-up by the sorbent material, dissipating the heat of sorption, recharging sorbate gas, and sealing the vessel for subsequent use.

By means of the cartridge articles of the present invention, the sorbate-loaded sorbent material is readily inserted into the interior volume of the fluid storage and dispensing vessel, subsequent to decontamination of the vessel, so that the cartridges may be inserted and opened prior or subsequent to the sealing of the vessel. As a result, the time, effort and expense of the manufacturing operation is materially reduced.

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure, as regards the following claims.

What is claimed is:

1. A modular sorbent cartridge assembly, comprising:
   a sorbent cartridge container enclosing an interior volume;
   a solid-phase physical sorbent medium in said interior volume;
   a sorbate gas sorptively held on the solid-phase physical sorbate medium; and
   a closure element leak-tightly sealing the sorbent cartridge container, said closure element being selectively openable to establish gas flow communication between said interior volume of the sorbent cartridge container and an exterior ambient environment of said container.

2. A modular sorbent cartridge assembly according to claim 1, wherein said solid-phase physical sorbent medium is in a particulate form.

3. A modular sorbent cartridge assembly according to claim 1, wherein the solid-phase physical sorbent medium comprises a sorbent material selected from the group consisting of alumina, silica, aluminosilicates, kieselguhr, macroriticulate polymers, carbon, clays and combinations of two or more of the foregoing.

4. A modular sorbent cartridge assembly according to claim 1, wherein said closure element comprises a thin film seal element.

5. A modular sorbent cartridge assembly according to claim 1, wherein the closure element comprises a manually removable element.

6. A modular sorbent cartridge assembly according to claim 1, wherein the closure element comprises a mechanically pierceable closure element.

7. A modular sorbent cartridge assembly according to claim 1, wherein the closure element includes a seal element with an integral pull-tab for manual removal of said closure element from the container.

8. A modular sorbent cartridge assembly according to claim 1, wherein said container is of vertical elongate form, holding a bed of particulate solid-phase physical sorbent medium therein, with a seal element at an upper end of said container, and said seal element including a pull-tab extension for manual removal of the closure element from the container.

9. A sorbate gas-loaded sorbent source comprising a multiplicity of modular sorbent cartridges, wherein each modular sorbent cartridge comprises:
   a sorbent cartridge container enclosing an interior volume;
   a solid-phase physical sorbent medium in said interior volume;
   a sorbate gas sorptively held on the solid-phase physical sorbate medium; and
   a closure element leak-tightly sealing the sorbent cartridge container, said closure element being selectively openable to establish gas flow communication between said interior volume of the sorbent cartridge container and an exterior ambient environment of said container.

10. A fluid storage and dispensing system comprising a fluid storage and dispensing vessel including an enclosed interior volume, means for discharging fluid gas from said vessel, and one or more modular sorbent cartridges in said interior volume, each said modular sorbent cartridge comprising:
    a sorbent cartridge container enclosing an interior volume;
    a solid-phase physical sorbent medium in said interior volume;
    a sorbate gas sorptively held on the solid-phase physical sorbate medium; and
    a closure element leak-tightly sealing the sorbent cartridge container, said closure element being selectively openable to establish gas flow communication between said interior volume of the sorbent cartridge container and an exterior ambient environment of said container.

11. A fluid storage and dispensing system according to claim 10, wherein the storage and dispensing vessel comprises means for opening said modular sorbent cartridge in situ in said vessel, to expose the solid-phase physical sorbent medium retaining said fluid to the interior volume of said storage and dispensing vessel.

12. A fluid storage and dispensing system according to claim 10, wherein said modular sorbent cartridge comprises a pierceable closure element, and said storage and dispensing vessel comprises means for piercing the closure element in situ to expose the modular sorbent cartridge contents to the interior volume of the vessel.

13. A fluid storage and dispensing system according to claim 10, wherein the sorbate gas comprises a gas having utility in semiconductor manufacturing.

14. A fluid storage and dispensing system according to claim 13, wherein said sorbate gas is selected from the group consisting of arsine, phosphine, hydrogen selenide, hydrogen telluride, diborane, boron trifluoride, boron trichloride, stibine, and compatible mixtures thereof.

15. A fluid storage and dispensing system according to claim 10, wherein the fluid is selected from the group consisting of hydride gases and halide gases.

16. A method of fabricating a fluid storage and dispensing system, comprising:
    providing a fluid storage and dispensing vessel;
    providing a modular sorbent cartridge including a container defining therewithin an interior volume holding a solid-phase physical sorbent medium sorptively retaining thereon a fluid, and a closure element leak-tightly sealing the interior volume of the cartridge from exposure to the ambient environment;
    installing the modular sorbent cartridge in the fluid storage and dispensing vessel;
    at least partially opening the closure element to establish fluid flow communication between the interior volume of the cartridge and the ambient environment of the cartridge in the storage and dispensing vessel; and
    leak-tightly sealing the vessel.

17. A method according to claim 16, wherein the closure element is at least partially opened before leak-tightly sealing the vessel.

18. A method according to claim 16, wherein the closure element is at least partially opened after leak-tightly sealing the vessel.

* * * * *